Figures 1, 2, 3, 4:
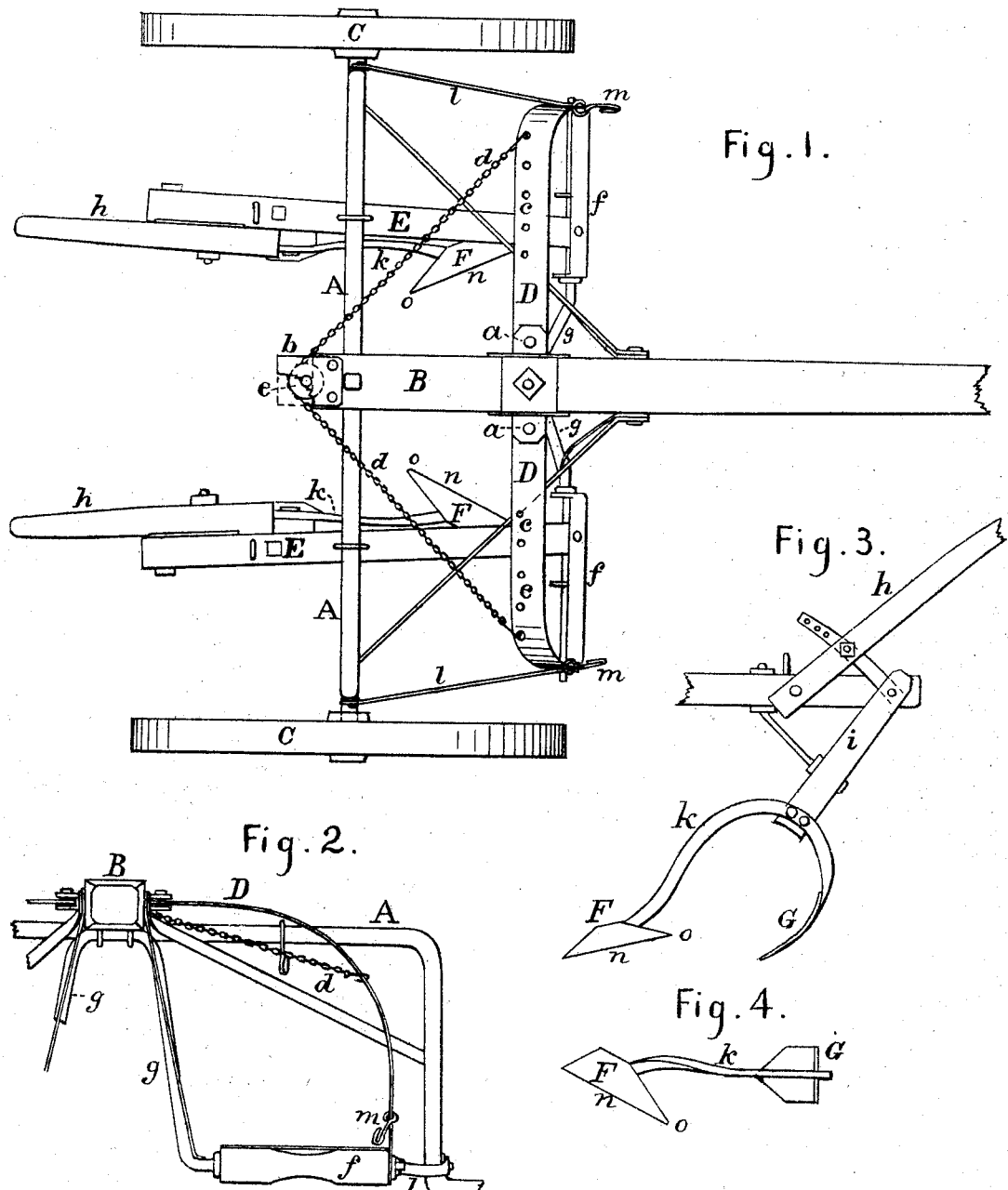

J. P. BATTEN.
Plows.

No. 146,638.

Patented Jan. 20, 1874.

Witnesses.
H. A. Daniels
C. B. Archer

Inventor.
James P. Batten
per G. B. Towes att.

UNITED STATES PATENT OFFICE.

JAMES P. BATTEN, OF UNION PRECINCT, ASSIGNOR OF ONE-HALF HIS RIGHT TO THOMAS M. TURNER, OF FREMONT, NEBRASKA.

IMPROVEMENT IN PLOWS.

Specification forming part of Letters Patent No. 146,638, dated January 20, 1874; application filed November 25, 1873.

*To all whom it may concern:*

Be it known that I, JAMES P. BATTEN, of Union Precinct, in the county of Saunders and State of Nebraska, have invented certain new and useful Improvements in Plow for Working Corn; and I do hereby declare the following to be a full, clear, and exact description of the invention, such as will enable others skilled in the art to which it pertains to make and use it, reference being had to the accompanying drawings, which form part of this specification.

My invention relates to agricultural implements known as cultivator-plows; and consists in certain modifications and improvements in the construction of the same, as hereinafter shown and described.

My improved plow, being more especially adapted to the cultivation of corn, has two plow-beams hinged at the fore ends, and directed by means of handles, each having a standard, which holds two shovels, one before the other, by means of a curved bar fastened to the standard. The frame is provided with a curved yoke or bow, extending outward and downward from the pole or tongue, and having suitable connections with the axle and other parts, the purpose of which is to equalize or regulate the draft, this being effected by means of a chain passing about a pulley at the back end of the pole or tongue, and having the ends hitched to the yoke by means of hooks on either side of the tongue, and at a greater or less distance from it, as desired.

In the accompanying drawing, which illustrates my invention, and forms a part of the specification thereof, Figure 1 is a plan view of the cultivating-plow herein described. Fig. 2 is a front view, partially illustrating the curved yoke or bow and axle. Fig. 3 represents the inner side of standard, with curved bar holding shovels attached. Fig. 4 is a plan view of scraper and shovel connected by the curved bar.

In the drawing referred to, A designates the axle, with the pole or tongue B resting on and fastened to the same, the said axle elbowing and turning downward, as shown in Fig. 2, before passing to the wheels C. D indicates a curved yoke or bow attached to and extending from the beam or pole B, to which its parts are attached or pivoted at $a$, the outer extremities extending downward about as low as the center of the wheels. The said yoke has the holes $c$, in which are hooked the ends of the chain $d$, which passes about the back end of the pole B on the pulley $e$ in the sheave $b$. Pivoted to the yoke at the extremities are the braces $l$, which are also pivoted or coupled to the axle. The couplings or hinges $f$, holding the fore ends of the plow-beams E, are supported by the yoke D and the rods $g$, and are constructed to allow the said plow-beams both a lateral and vertical movement in working them. The plow-beams E have the adjustable handles $h$ and standards $i$. (Shown in Fig. 3.) At the lower end of each standard, and firmly fastened thereto, is the bent or curved bar $k$, projecting forward and backward from the standard. To the forward extremity is attached the angular scraper or shovel F, of the form shown in Fig. 4, and the shovel G is attached to the back end of the curved bar, as shown.

In operation, the curved yoke D, supporting the hinges, and braced as above stated, is governed by the chain $d$, passing on the pulley $e$, as stated. Either end of the chain may be attached to the yoke, at a point nearer to or farther from the beam or pole B, the holes $c$ being provided for such purpose, and thus the draft is equalized, or the weight thereof shifted from one side to the other, as may be desired, the traces being coupled to the yoke at $m$. The angular scrapers and shovels F and G, attached to the curved bars $k$, are directed by means of the handles, and move forward, one each side of the row. The angular scraper F, having a long edge, $n$, inclining outward from the acute angle $o$, cuts the surface of the ground, throwing it inward, while the shovel G, following, makes a deeper furrow, and throws up a greater quantity of earth.

Having described my invention, my claim is as follows:

1. The equalizer or curved yoke D, chain $d$, and pulley $e$, in combination with rods $g$ and hinges $f$, as and for the purposes set forth.

2. In combination with the hinged plow-beam and standard, the curved bar $k$, acute-angled scraper F, and shovel G, constructed and operating as shown and described.

In testimony that I claim the foregoing, I have hereunto set my hand and seal this 16th day of September, 1873.

JAMES P. BATTEN. [L. S.]

Witnesses:
 WM. E. LEE,
 FR. W. WIRMINGHAM.